No. 775,244. PATENTED NOV. 15, 1904.
O. C. MEYER.
ADJUSTABLE PIPE HANGER.
APPLICATION FILED APR. 7, 1904.
NO MODEL.
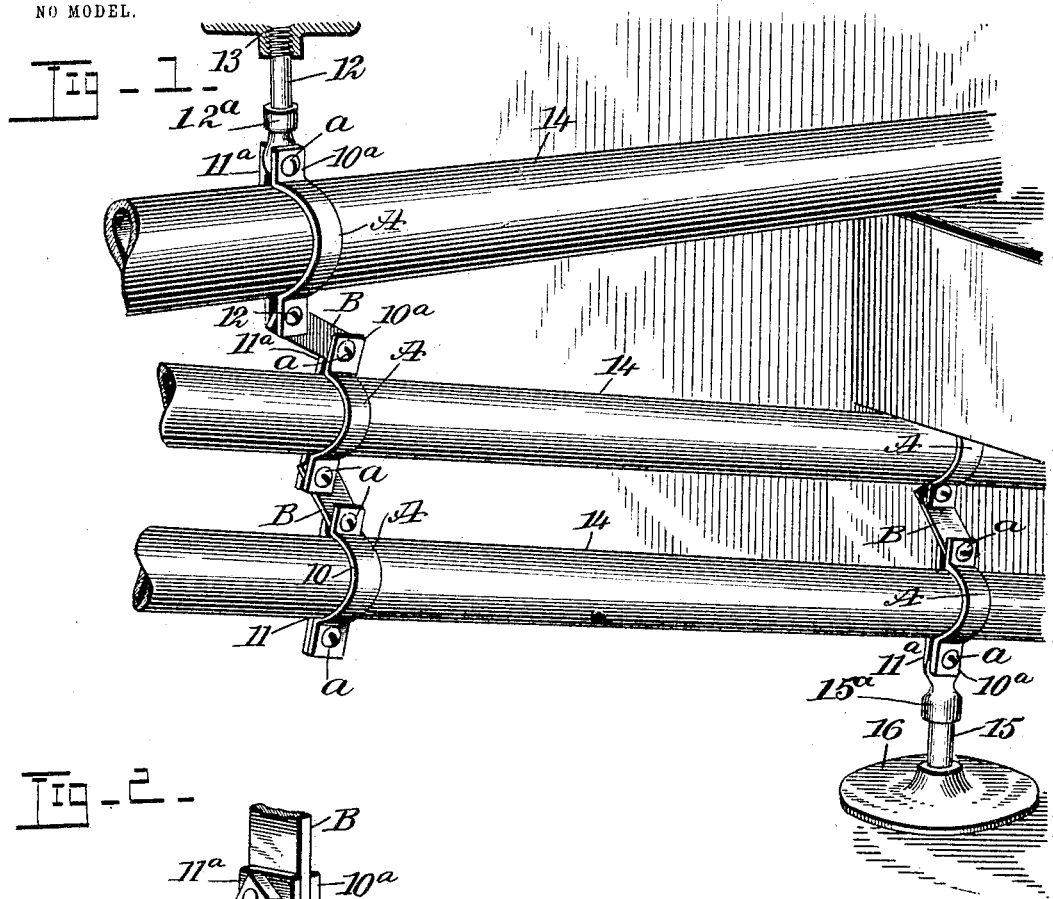
WITNESSES:
INVENTOR
Otto C. Meyer
BY
ATTORNEYS No. 775,244.         Patented November 15, 1904.

UNITED STATES PATENT OFFICE.

OTTO C. MEYER, OF NEW YORK, N. Y.

ADJUSTABLE PIPE-HANGER.

SPECIFICATION forming part of Letters Patent No. 775,244, dated November 15, 1904.

Application filed April 7, 1904. Serial No. 202,090. (No model.)

*To all whom it may concern:*

Be it known that I, OTTO C. MEYER, a citizen of the United States, and a resident of the city of New York, borough of Brooklyn, in the county of Kings and State of New York, have invented a new and Improved Adjustable Pipe-Hanger, of which the following is a full, clear, and exact description.

The purpose of the invention is to provide a pipe-hanger in which lightness is combined with strength and by means of which pipes may be arranged in series one over or under the other and be placed in parallelism or at angles with each other to each other vertically or horizontally.

A further purpose of the invention is to provide a device for pipes which may be supported from points overhead or points on the floor, side walls, or points intermediate of the upper and lower support.

Another purpose of the invention is to provide a construction of pipe-hanger which will permit all necessary expansion or contraction without injury to the hanger, and, furthermore, to so construct the hanger that it is flexible in its clamping action.

The invention consists in the novel construction and combination of the several parts, as will be hereinafter fully set forth, and pointed out in the claims.

Reference is had to the accompanying drawings, forming a part of this specification, in which similar characters of reference indicate corresponding parts in both figures.

Figure 1 is a perspective view of the improved device in two positions, illustrating a series of pipes supported thereby; and Fig. 2 is a detail perspective view of a portion of the device.

The improved pipe-hanger consists of a series of loops A, pivotally and adjustably connected by links B and bolts $a$. The bolts $a$ are employed to adjustably connect the loops with the links, and said bolts are provided with suitable nuts, so that the connections between the links and the loops may be tight or loose, as occasion may demand. Each loop preferably consists of two opposing curved sections 10 and 11, provided at their ends with lips, (designated, respectively, as $10^a$ and $11^a$,) opposing lips being in parallel position relative to each other and at an angle to the sections of the loop. The links B, which serve to connect the various loops A, are loosely placed between the lips $10^a$ and $11^a$ of the said loops, and the bolts $a$ above referred to are passed through the lips and through the links B, the bolts being provided with heads at one end, the nuts above referred to being at their opposite ends. Under this construction by moving the links up or down to the right or to the left and adjusting the loops on the links the pipes 14, carried by the loops, may be given various positions relative to each other, permitting the pipes, with the loops applied, to be so laid as to avoid obstructions in a given path. In making such adjustments in the loops and links the bolts $a$ are loosened, and when the proper adjustments have been made the bolts are tightened. It will be further observed that under this construction the pipes are free to contract and expand without changing the position of the supporting-loops A. I further desire it to be understood that the lowermost loop in a chain of loops, if the device is supported from overhead and the uppermost loop in a chain of loops supported from below, may be made in one section representing a split ring, and such a loop when employed will be provided with but two lips, corresponding to the lips $10^a$ and $11^a$ and located one at each side of the cut portion of the ring.

One end loop A is shown connected between its lips $10^a$ and $11^a$ with a socket member $12^a$, attached to a rod 12, and the said rod is usually screwed into a socket-plate 13, which is adapted for attachment to an overhead support, as is shown at the left in Fig. 1, or a sustaining rod or bar 15 may be attached to a socket member $15^a$, connected with the lowermost loop, and the said rod or bar 15 is then attached to a socket-plate 16, secured to the floor or other lower support, as is shown at the right in Fig. 1, or, as has been stated, the socket-plates may be secured to the side walls or to any other perpendicular support for the purpose of sustaining the pipes 14.

It is not necessary that all of the loops A shall be of the same diameter, as some may be large and the others small, according to the diameter of the pipes 14 they are adapted to receive.

A pipe-hanger constructed as above described is exceedingly simple. It is adjustable in a practicable manner, and by its use pipes can be readily supported with safety to themselves and to the hangers, and the pipes may be run parallel or one at an angle to the others, as occasion may demand.

Having thus described my invention, I claim as new and desire to secure by Letters Patent—

1. A pipe-hanger consisting of a series of loops constructed in separable sections, links connecting adjacent loops, pivot-pins for the links, and tightening devices for the pivot-pins.

2. A pipe-hanger consisting of a series of loops constructed in separable sections, links connecting adjacent loops, pivots for the links, tightening devices for the pivots, a supporting-bar pivotally connected with one of the end loops, and a receiver for the said supporting-bar.

3. In a pipe-hanger a plurality of loops, each consisting of two sections oppositely curved, having lips extending from the end portions of the sections, links each of which connects adjacent loops, pivots passed through the lips and links, and tightening devices for the pivots.

In testimony whereof I have signed my name to this specification in the presence of two subscribing witnesses.

OTTO C. MEYER.

Witnesses:
RUDOLPH GUENTHER,
FRANK J. COUPE.